Figure 1:
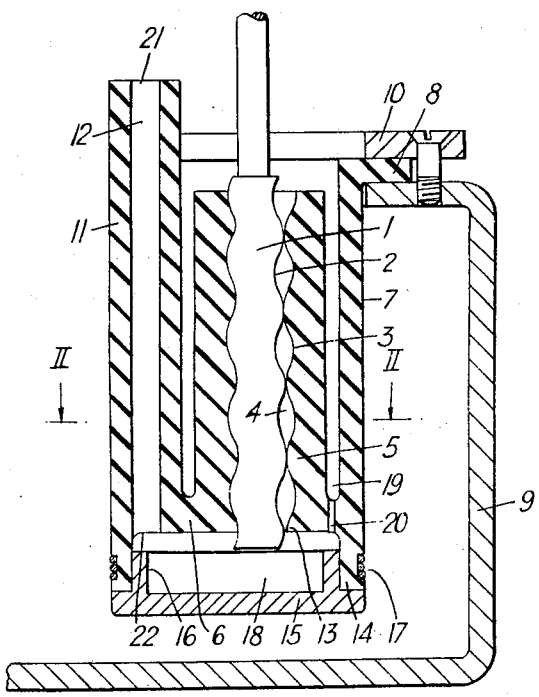

Dec. 2, 1958   E. ALCOCK   2,862,454
HELICAL GEAR PUMPS

Filed June 24, 1955   2 Sheets-Sheet 1

Inventor.
ERNEST ALCOCK,
By *Allen & Allen*
Attorneys.

Dec. 2, 1958 — E. ALCOCK — 2,862,454
HELICAL GEAR PUMPS
Filed June 24, 1955 — 2 Sheets-Sheet 2

Inventor
ERNEST ALCOCK,
By
Attorneys.

United States Patent Office 2,862,454
Patented Dec. 2, 1958

2,862,454

HELICAL GEAR PUMPS

Ernest Alcock, London, England, assignor, by mesne assignments, to Robbins & Myers, Inc., Springfield, Ohio, a corporation of Ohio Application June 24, 1955, Serial No. 517,843

Claims priority, application Great Britain June 25, 1954

7 Claims. (Cl. 103—117)

This invention relates to a stator assembly adapted for use in a helical gear pump of the type comprising a resilient stator, having a rotor opening provided with internal helical grooves or threads, and a rotor, adapted to mate with the stator and provided with external grooves or threads, the stator having one groove or thread more than the rotor. A pump of this type is described in British Patent No. 400,508. The stator assembly of this invention is especially useful in connection with, although its use is not restricted to, a pump for gas or vapour e. g. a vertical glandless air suction pump.

A characteristic of helical gear pumps of the said type is that when the rotor is rotated the stator performs an orbital movement about the rotor in a cylindrical path.

One object of the invention is to provide a stator assembly with a resilient inlet pipe one end of which is secured to the inlet end of the rotor opening and, in use, partakes of the said orbital movement, and the other end of which may be maintained still.

Another object of the invention is to provide a helical gear pump with such a stator assembly.

Broadly stated, the invention provides a stator assembly comprising a resilient stator, a helically grooved rotor opening in said stator, a resilient inlet pipe permanently secured to the stator adjacent the inlet end only of the rotor opening, and a passageway in said pipe communicating with said inlet end, whereby the end of the pipe remote from the said inlet end may be maintained substantially still when an orbital movement is given to the stator. Thus the pipe may be made of the same material as the stator and the stator assembly may be an integral moulding of rubber or a rubber-like material. Alternatively, the pipe may be made of a different resilient material from that of the stator, the pipe being permanently bonded to the stator. Preferably, the said passageway and the rotor opening are arranged to extend in the same general direction.

The stator assembly may be provided at one end with a closed chamber with which the passageway and the rotor opening communicate. Thus there may be provided a cap having a flange received within a sleeve formed in the end of the assembly adjacent the inlet end of the rotor opening, the cap defining with the stator the said closed chamber.

The stator is preferably formed integrally with and disposed within a cylindrical member, the pipe being integrally joined to the outside wall of the cylindrical member.

Figure 2:
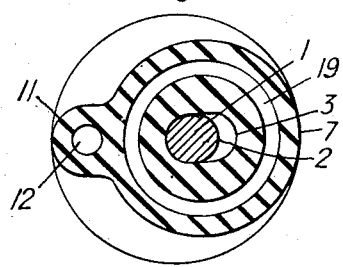
Figure 3:
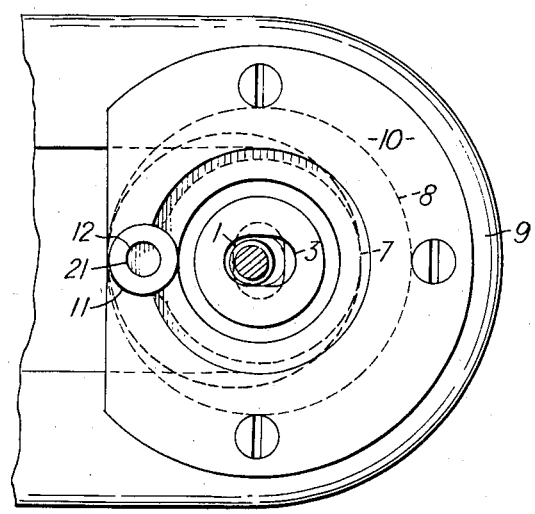

The invention is illustrated, by way of example, in the accompanying drawings in which:

Fig. 1 is a sectional elevation of part of a helical gear pump provided with a stator assembly according to the invention, Fig. 2 is a section on the line II—II of Fig. 1, and Fig. 3 is a plan view of the same.

Referring to the drawings, a helical gear pump comprises a rotor 1 provided with external helical grooves 2, the rotor being adapted to be manually or power driven. The helical grooves 2 in the rotor 1 co-operate with corresponding internal helical grooves 3 in a rotor opening 4 formed within a stator 5 of resilient material (e. g. rubber). The rotor opening 4 has one groove more than the rotor 1. The rotor opening 4 extends fully throughout the length of the stator 5 which is integral with a flange member 6 which unites the stator 5 with an outer cylindrical member 7 within which the stator 5 is disposed. The cylindrical member 7 is formed with a flange 8 which is mounted on the base 9 of the pump and clamped thereto by a stator clamping plate 10. Integrally formed with the stator 5 and the cylindrical member 7 and joined to the outside wall of the latter is a resilient axially extending pipe 11 having a passageway 12 therethrough. The end of the stator assembly adjacent the inlet end 13 of the rotor opening 4 is in the form of a projecting sleeve 14 which receives a metal or other rigid cap 15, the latter being formed with a projecting flange 16 to enter the projecting sleeve 14. A sealing wire 17 secures the sleeve 14 to the flange 16. The cap 15 defines with the stator 5 a closed chamber 18 with which the passageway 12 and rotor opening 4 communicate.

The space 19 between the stator 5 and the cylindrical member 7 serves as a well for a lubricant, the space 19 being in restricted communication with the closed chamber 18 by way of a bleed hole 20.

In use, the rotor 1 is rotated and gas or vapour to be pumped is drawn into the inlet end 21 of the passageway 12. The said material is drawn into the chamber 18 from whence it passes along the rotor opening 4 and is discharged from the pump. The rotation of the rotor 1 causes the stator to perform an orbital movement about the rotor in a cylindrical path. This orbital movement will, of course, be imparted to the outlet end 22 of the pipe 11, but, because of the flexibility of the pipe, its inlet end 21 may be maintained substantially still by clamping it to a stationary part of the pump.

The present invention includes within its scope helical gear pumps incorporating stator assemblies in accordance with the present invention.

I claim:

1. For use in a pump of the kind employing a helically grooved rotor in which rotation of the rotor about a fixed axis causes orbital movement of the stator, a unitary elastomeric stator comprising, an outer tubular member, a stator member disposed within said tubular member and having one end attached thereto, said stator member having a helically grooved rotor tunnel extending throughout its length, and an inlet pipe formed integrally with and extending lengthwise of said tubular member, one end of said pipe projecting beyond the unattached end of said tubular member, and the other end of said pipe communicating with a space within said tubular member beyond the end of said stator member.

2. For use in a pump of the kind employing a helically grooved rotor in which rotation of the rotor about a fixed axis causes orbital movement of the stator, an elastomeric stator comprising, an outer tubular member, a stator member disposed within said tubular member and having one end attached thereto, said stator member having a helically grooved rotor tunnel extending throughout its length, an inlet pipe formed integrally with and extending lengthwise of said tubular member, one end of said pipe projecting beyond the unattached end of said tubular member, and the other end of said pipe communicating with a space within said tubular member beyond the end of said stator member, and a closure member attached to the end of said tubular member to enclose said space.

3. An elastomeric stator as claimed in claim 2 wherein the closure member is a flanged cap, the flange on said cap being received within said tubular member.

4. For use in a pump of the kind employing a helically grooved rotor in which rotation of the rotor about a fixed axis causes orbital movement of the stator, a unitary elastomeric stator comprising, an outer tubular member, said tubular member being provided with an integral flange at one end by which it may be supported in the casing of a pump, a stator member disposed within said tubular member and having one end attached thereto, said stator member having a helically groove rotor tunnel extending throughout its length, and an inlet pipe formed integrally with and extending lengthwise of said tubular member, one end of said pipe projecting beyond the unattached end of said tubular member, and the other end of said pipe communicating with a space within said tubular member and beyond the end of said stator member.

5. For use in a pump of the kind employing a helically grooved rotor in which rotation of the rotor about a fixed axis causes orbital movement of the stator, an elastomeric stator comprising, an outer tubular member, the said tubular member being provided with an integral flange at one end by which it may be supported in the casing of a pump, a stator member disposed within said tubular member and having one end attached thereto, said stator member having a helically grooved rotor tunnel extending throughout its length, and an inlet pipe formed integrally with and extending lengthwise of said tubular member, one end of said pipe projecting beyond the unattached end of said tubular member, and the other end of said pipe communicating with a space within said tubular member and beyond the end of said stator member, and a closure member attached to the end of said tubular member to enclose said space.

6. An elastomeric stator as claimed in claim 5 wherein the closure member is a flanged cap, the flange on said cap being received within the said tubular member.

7. A stator as claimed in claim 5 having a restricted passage for lubricant through the web joining said stator member to said tubular member.

References Cited in the file of this patent
UNITED STATES PATENTS

| | | |
|---|---|---|
| 2,409,688 | Moineau | Oct. 22, 1946 |
| 2,545,626 | Moineau | Mar. 20, 1951 |
| 2,603,161 | Lloyd | July 15, 1952 |
| 2,603,162 | Lloyd | July 15, 1952 |
| 2,612,845 | Byram et al. | Oct. 7, 1952 |
| 2,765,114 | Chang | Oct. 2, 1956 |

FOREIGN PATENTS

| | | |
|---|---|---|
| 113,009 | Australia | Apr. 28, 1941 |
| 519,756 | Belgium | May 30, 1953 |